United States Patent [19]

Trouillard

[11] 4,191,527
[45] Mar. 4, 1980

[54] APPARATUS FOR THE DEHYDRATION OF WASTE AND VEGETABLE MATTER

[75] Inventor: Charles Trouillard, Nantes, France

[73] Assignee: Hilda Bolli, Nyon, Switzerland

[21] Appl. No.: 930,045

[22] Filed: Aug. 1, 1978

[30] Foreign Application Priority Data

Aug. 4, 1977 [FR] France .................. 77 23999
Nov. 16, 1977 [FR] France .................. 77 34427

[51] Int. Cl.² .................. F23J 5/02; F26B 11/04; F27B 7/10
[52] U.S. Cl. .................. 432/72; 34/134; 34/138; 432/114
[58] Field of Search .............. 432/72, 112, 114, 72, 432/118; 34/134, 138; 426/523

[56] References Cited

U.S. PATENT DOCUMENTS

| | | | |
|---|---|---|---|
| 514,553 | 2/1894 | Jones et al. | 432/112 |
| 791,600 | 6/1905 | Anderson et al. | 34/138 |
| 1,330,219 | 2/1920 | Rockwell | 432/118 |
| 1,639,243 | 8/1927 | Weintz | 432/114 |
| 2,267,259 | 12/1941 | Adt | 34/134 |
| 3,306,237 | 2/1967 | Ransom Jr. | 432/72 |
| 3,627,290 | 12/1971 | Grieve | 432/72 |
| 3,836,324 | 9/1974 | Shaefer et al. | 432/112 |
| 3,963,416 | 6/1976 | Mach | 432/72 |

FOREIGN PATENT DOCUMENTS 125484  4/1919  United Kingdom .................. 432/112

*Primary Examiner*—S. Leon Bashore
*Assistant Examiner*—Steve Alvo
*Attorney, Agent, or Firm*—Darby & Darby

[57] ABSTRACT

Apparatus for dehydrating organic waste material in a rotary oven. The oven is within an insulated chamber and the oven is heated by a burner. The waste gases from the oven are recycled and burnt in the burner. The dried product is usable for soil enrichment and for feeding to animals.

10 Claims, 4 Drawing Figures

APPARATUS FOR THE DEHYDRATION OF WASTE AND VEGETABLE MATTER

The present invention relates to an apparatus and a process for treating organic waste such as waste vegetable matter, animal and bird droppings, dung, waste from slaughterhouses, waste from incubators and waste from knackers' yards into a product suitable for soil enrichment or for feeding to animals. The process surpresses the odours released from these materials, particularly dung and organic waste, when they are dried.

Accordingly, one aspect the present invention provides an apparatus for treating organic waste comprising an insulated chamber, a rotary oven located in the chamber, a burner adapted to provide hot gases to heat the rotary oven and a pipe adapted to carry gases released from the organic waste from the oven to the burner.

In a further aspect, the present invention provides a process for the treatment of organic waste, wherein the waste is continually mashed in a rotary oven heated by contact with hot gas from a burner, odourous vapours from the oven being recycled and burnt in the burner.

In the process of the present invention, the waste materials are continuously mixed in a rotary oven preferably in the form of a double frustum, the oven being heated by means of a fluid heated by a suitable source of heating such as a burner. Pressure in the oven is reduced by a fan and the nauseous vapours are recycled so that they are burnt by the heating source.

The heat treatment is stopped when the desired moisture content is reached and the dried product is then cooled.

The apparatus of the present invention comprises a chamber with insulated walls which is heated by hot gases produced by a burner, in which is placed a sealed rotary oven which is mounted with its axis inclined to the vertical, this oven being brought to the desired baking temperature by the hot gases from the burner, the oven being fitted with a communicating pipe to the burner intake in order to direct to the latter, gases released from the treated matter.

The oven is preferably in the form of a double frustum and fitted interiorly with screw-shaped vanes.

One end of the oven is fitted with a removable tube which leads the released gases to the burner, this tube being flexible at the point where it is fitted to the oven.

The chamber through which the hot gases travel is provided with a door or removable bulkhead through which a chute passes for the admission of materials. This door is located adjacent the highest point of the oven.

The highest end of the oven is provided with a closure cap which is removable and below it is fitted a collection funnel for receiving the material which extends externally by means of an evacuation pipe.

A fan is provided in the pipe connecting the oven to the burner to ensure the suction of the released gases from the oven towards the burner.

The burner is mounted in a mixing chamber that surrounds the flame and internal conical fins direct the gases and vapours coming from the oven towards the centre of the flame.

The mixing chamber associated with the burner is provided at one end with a perforated sheet, the temperature of which is raised by the vapours from the oven.

The oven is rotated by a shaft which traverses a stokehold and which is moved by a driving mechanism outside the stokehold, and a flexible air-tight joint is provided between the wall of the stokehold and the oven so that runner bearings are exterior to the stokehold.

The oven is provided with at least one heat exchanger tube, hermetically fixed to the oven at its end. The exchange tube or tubes are provided with orifices whereby the exchanger tube or tubes are capable of being filled by a current of hot gases.

The heater is placed laterally in relation to the oven in the path of the orifices of the exchanger tubes, in such a way that, when the oven rotates, the orifices of the tubes line up successively in front of the burner.

The above-mentioned process can be used to dehydrate muds from tanks and docks from the sedimentation of waste water.

The invention is further illustrated in the accompanying Drawings wherein.

Figure 1:
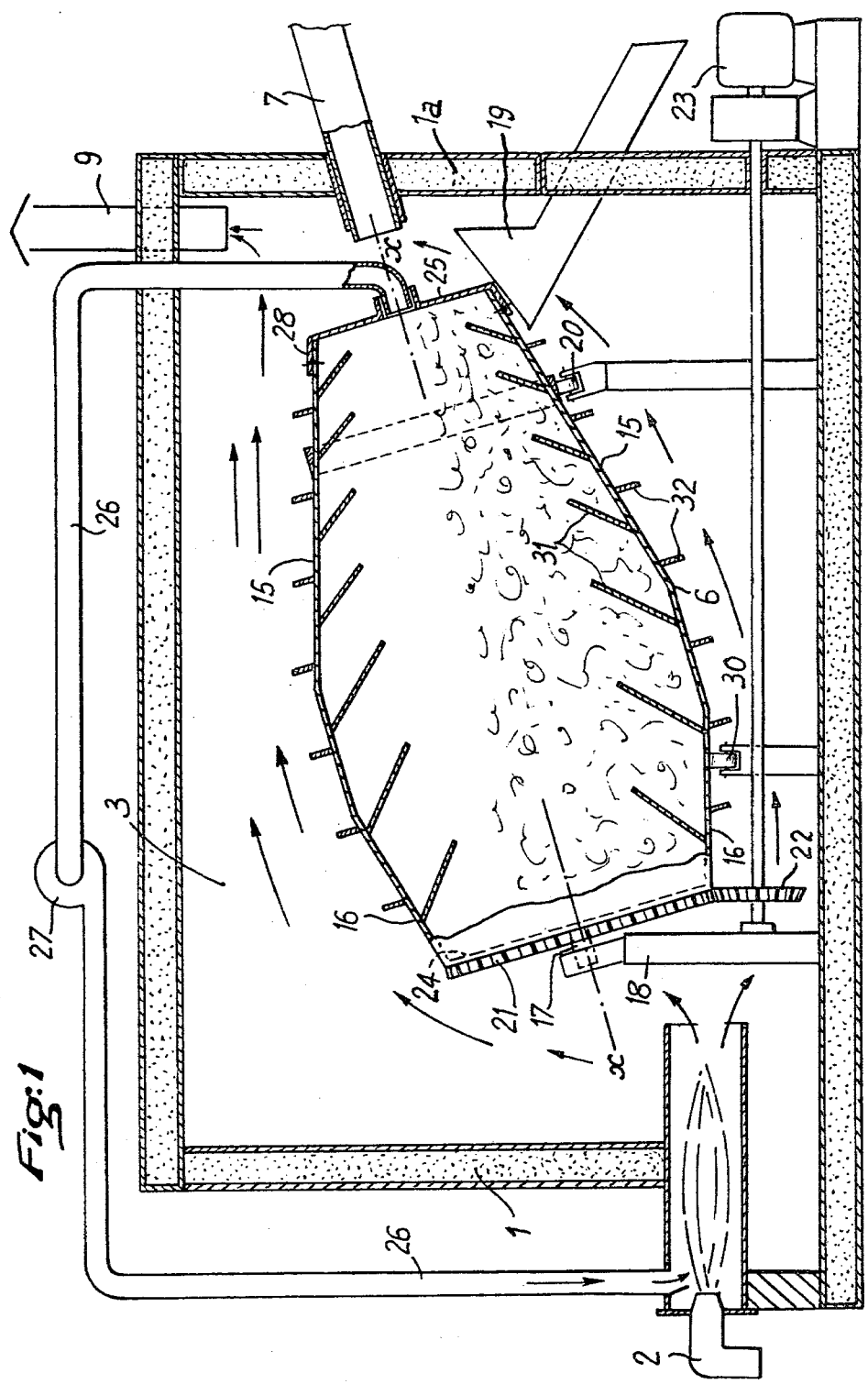
FIG. 1 shows a schematic sectional elevation of a machine in the direction of its axis in accordance with one embodiment of the present invention.

Referring to FIG. 1, it is seen that the machine comprises a chamber 3, the walls of which 1 are insulated for example, made from two layers of between which is a filling of rock wool. Inside this chamber there is a rotary oven 6. A burner 2 is provided to produce the hot gases needed to heat the oven enclosure. The hot gases, after having pervaded the chamber 1, as indicated by the arrows, are evacuated through flue-pipe 9.

For loading the baking enclosure, the machine carries a pipe 7 which passes through a door 1a. This pipe 7 can be inserted into the oven 6, a closure cap 25 being first of all removed for loading to proceed. The pipe 7 is withdrawn and the access aperture in the door 1a is then sealed after closing the cap 25, the machine is rotated and the burner ignited.

The apparatus is provided with a funnel 19 for the evacuation of baked materials.

The door 1a permits access to the interior of the chamber.

The oven is in this example formed as two frusta 15 and 16 of a suitable metal, e.g. steel, joined together at their wider ends. The oven revolves about axis x—x inclined to the horizontal. Runner bearings 20 and 30 at the front and rear support the oven in its inclined. Rotation of the oven is brought about by a cogged crown-wheel 21 encircling the lower closed end 24. The crown-wheel 21 is engaged by a pinion 22 operated by a combined motor-reducer 23 fitted with a reversing facility so that the oven can be rotated in a clockwise or anti-clockwise direction.

The lower end 24 of the oven is permanently closed, whereas the upper end is provided with a removable cap 25. This cap 25 is fixed in its closed position by means of bolts on edges 28 of the base of the frustum 16. This cap 25 is removed by unscrewing the fixing bolts, an operation which is easily performed through the door 1a.

A pipe 26 passes from the center of the cap 25 to the burner 2. This pipe 26 is provided with a fan 27 which sucks the gases released in the oven and propels them towards the burner intake 2. The pipe 26 is flexible at the point where it leaves the cap 25 and for at least some of its length. The flexible end of the tube is inserted into the central opening of the cap 25, a little play being provided so that it is not dragged out by the rotation of the oven 6. The flexibility of the pipe facilitates its insertion or withdrawal from the opening of the cap 25.

The oven 6 is fitted interiorly with vanes 31 which slope helicoidally or in the form of a spiral, continuous or interrupted. These vanes have two functions, one is to improve the mashing of the treated matter during the rotation of the oven in one direction and the other is to (by reason of the positioning of these paddles) conduct the material towards the outlet that is opened by releasing the cap 25 when baking is finished and on reversing the direction of rotating. Vanes 32, which are annular in shape, can be fitted to the outside of the oven 6 to improve the heat exchange through the wall of the enclosure.

Figure 2:
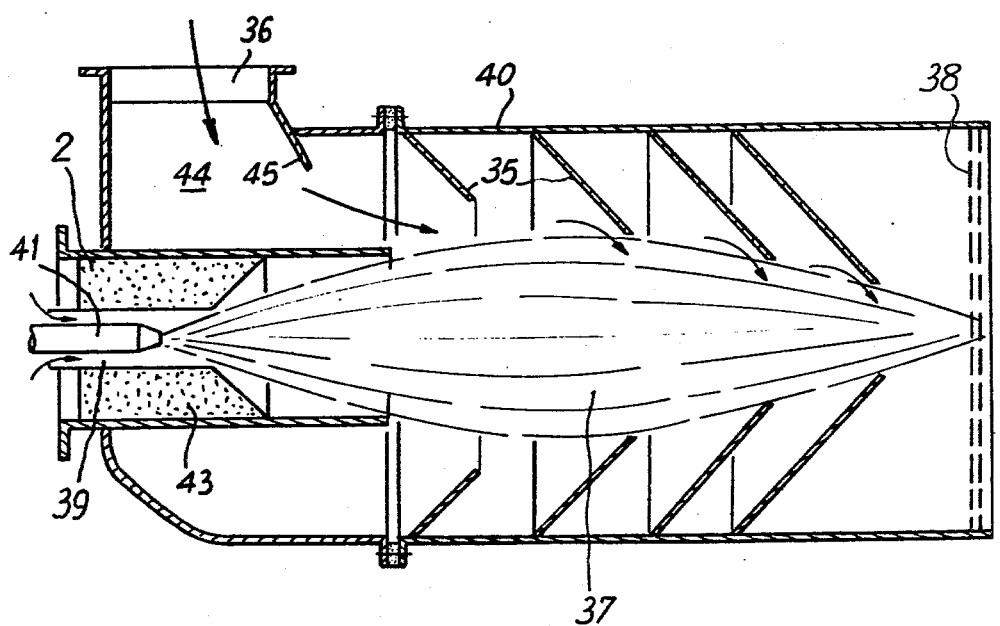
FIG. 2 shows on a large scale, a schematic sectional elevation of the burner and mixing chamber of FIG. 1.

The burner 2 as shown in FIG. 2, includes a central gas intake 41 surrounded by an air intake 39 for combustion. A tough steel facing 43 is provided to protect that part from which the flame emerges. The heater is surrounded by a ring-shaped chamber 44 into which the vapours from the oven are introduced at 36. This chamber 44 is provided with a mixer which allows the above-mentioned vapours to penetrate into the burner flame. This mixer comprises a cylindrical steel wall 40 inside which are attached cone shaped fins 35. The vapours are deflected in the direction of the arrows by a metal plate, 45 at their entry into the chamber 44, and are directed by the cones 35 towards the flame 37 where their combustible particles are burnt in order to deodorise the vapours.

Figure 3:
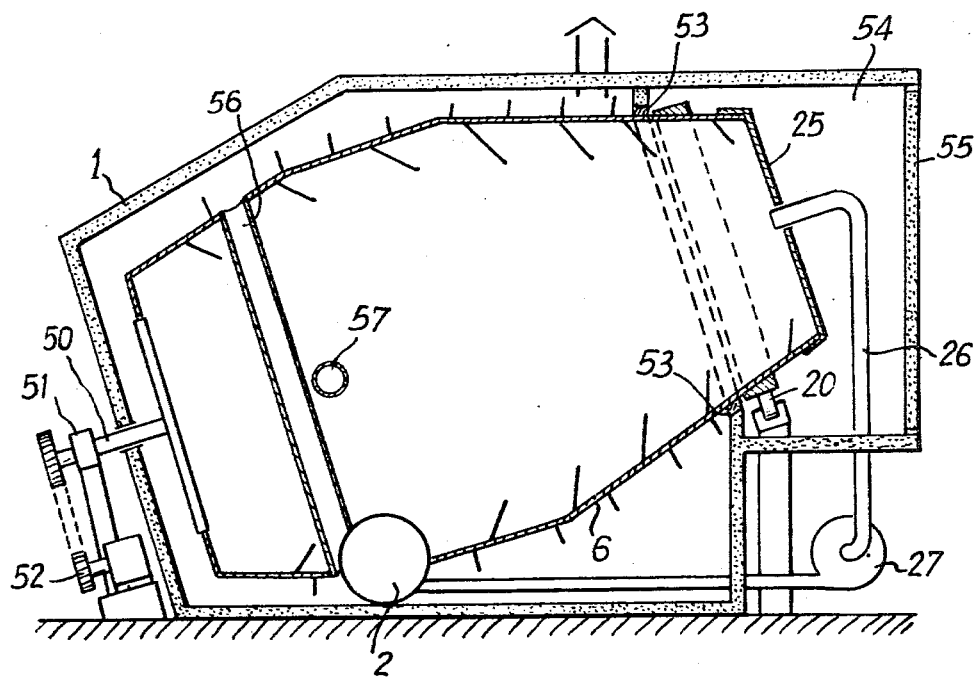
FIG. 3 is a schematic sectional view of a machine in accordance with another embodiment of the present invention.

In FIG. 3, the stokehold of the chamber is smaller than that of FIG. 1. The burner 2 is placed laterally in relation to the oven 6. A shaft 50 passes through a stokehold and supports the oven 6 by means of support block 51.

The assembly 52 for rotating the oven 6 is fitted outside the stoke-hold so as not to be subjected to high temperatures. The rolling track and the support bearings 20 are also placed outside the stoke-hold. A flexible air-tight joint 53 is provided in order to isolate the stoke-hold from the access compartment 54. This compartment 54 is fitted with a hinged door 55.

The closure cap 25, the pipework 26 leading the gases to the burner, and the fan 27 are similar to those shown in FIG. 1.

Two straight exchanger tubes 56 and 57 pass through the oven 6. These tubes have orifices adapted that line up successively in front of the burner. The tubes are welded to the oven at the orifices so that there is no communication with the interior of the oven.

Figure 4:
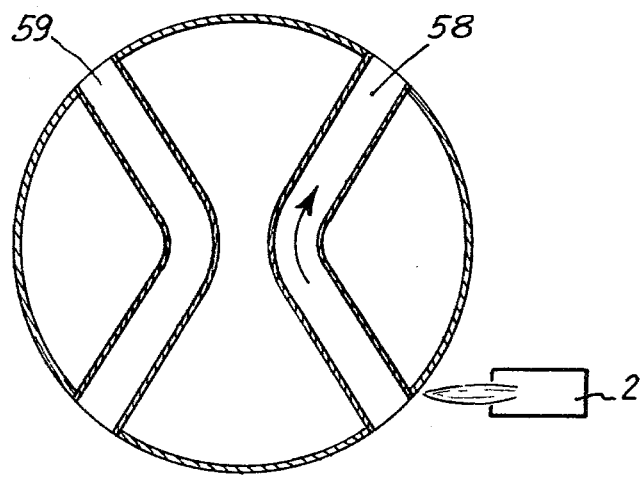
FIG. 4 is a cross-section through the apparatus in accordance with the present invention, showing one arrangement of the exchanger tubes.

FIG. 4 shows an alternative arrangement of these tubes. In this arrangement, tubes 58 and 59 are bent, in such a way that their orifices are in the same section of the oven and line up in turn exactly in front of the burner. This results in a much better circulation of hot gases in the tubes, that is, a much better exchange of heat between the stoke-hold and the interior of the enclosure, something which improves the efficiency of the machine and the speed of dehydration.

These improvements are also facilitated by the lateral positioning of the burner which brings the flame nearer to the sealed oven and to the material being treated. This results in a further economy of energy.

In the examples shown, only two exchanger tubes have been represented, however, several can be fitted.

The invention has particular use for the dehydration and transformation of organic waste such as poultry droppings into products for soil enrichment. It can, however, be used to dehydrate muds from tanks/docks from the sedimentation of waste waters, industrial or sewerage.

What we claim is:

1. Apparatus for dehydrating organic waste material comprising
a heat insulated chamber,
a substantially closed oven within said chamber rotatably mounted with its axis inclined to the vertical with respect to the chamber,
means for rotating the oven about its axis,
burner means for providing heat directly to the interior of said chamber to heat the oven to cause the waste therein to give off vapors,
and conduit means connecting the oven directly to said burner means and provided with a fan which ensures the flow of the vapors from the oven to the burner means for decomposition.

2. An apparatus as claimed in claim 1, wherein the oven is in the form of a double frustum and is interiorly fitted with spiral shaped vanes.

3. An apparatus as claimed in claim 1 further comprising a closure at the highest end of the oven, said conduit means being fitted into the said closure and being flexible in the part adjacent to the closure.

4. An apparatus as claimed in claim 3 wherein the closure at the highest end of the oven is removable, funnel means below said closure for the reception of waste material, and an evacuation pipe communicating with the funnel means to the exterior of the chamber.

5. An apparatus as claimed in claim 1 wherein the chamber is provided on the highest side of the oven with a removable section and a hopper for said section for feeding in the waste material.

6. An apparatus as claimed in claim 1 wherein the burner means produces a flame and is provided with a mixing chamber surrounding the flame and carrying interiorly conical partitions which direct the vapors coming from the oven towards the centre of the flame.

7. An apparatus as claimed in claim 6, wherein the burner means mixing chamber ends in a perforated plate which aids in the completion of the deodorisation of the vapors released from the waste material in the oven.

8. An apparatus as claimed in claim 1 further comprising a shaft that passes through the insulating chamber, said means for rotating the oven being outside the chamber, flexible air-tight means provided between the wall of the chamber and the oven and runner bearings for the oven located outside the portion of the chamber sealed by said flexible air-tight means.

9. An apparatus as in claim 1 wherein the oven is further provided with at least one heat exchanger tube, which is hermetically fixed to the oven at the level of its extremities, and capable of being pervaded by a flow of hot gases from within the chamber.

10. An apparatus as claimed in claim 9, wherein the burner is placed laterally in relation to the oven, in the path of the orifices of the exchanger tubes so that when the oven rotates, the orifices of the exchanger tubes line up successively in front of the burner.

* * * * *